Sept. 20, 1971  J. MacMANUS  3,606,266
MACHINE FOR PRODUCING AERATED TOPPINGS
Filed Dec. 10, 1969  5 Sheets-Sheet 1

Fig. 1.

Inventor
John MacManus
By
McKenna, Mansbach, Pickette & Main
Attorneys

Sept. 20, 1971    J. MacMANUS    3,606,266
MACHINE FOR PRODUCING AERATED TOPPINGS
Filed Dec. 10, 1969    5 Sheets-Sheet 3

Inventor
John MacManus
By
McCanna, Morsbach, Pillote & Muir
Attorneys

Sept. 20, 1971  J. MacMANUS  3,606,266
MACHINE FOR PRODUCING AERATED TOPPINGS
Filed Dec. 10, 1969  5 Sheets-Sheet 4

Inventor
John MacManus
By
McCanna, Mosebach, Pillote + Thiis
Attorneys

United States Patent Office 3,606,266
Patented Sept. 20, 1971

3,606,266
MACHINE FOR PRODUCING AERATED TOPPINGS
John MacManus, 143—16 22nd Road,
Whitestone, N.Y. 11357
Filed Dec. 10, 1969, Ser. No. 883,867
Claims priority, application Great Britain, Dec. 31, 1968, 61,986/68; Feb. 13, 1969, 7,982/69; Sept. 5, 1969, 44,032/69
Int. Cl. B01f 15/02
U.S. Cl. 259—4
34 Claims

ABSTRACT OF THE DISCLOSURE

The machine includes a motor-driven pump having an inlet connected both to an air intake and to an unpressurized liquid product container, whereby the liquid product and air are simultaneously drawn into the pump. The pump outlet is connected to a static, narrow-orifice homogenizer which emulsifies the liquid and air mixture. A solenoid-operated valve is located at the outlet of the homogenizer and an electrical control system simultaneously opens the valve and starts the motor.

---

This invention relates to machines for producing whipped cream and other stiff fluent aerated food products for use in filling or decorating pastries, cakes and other confectionary. The kind of machine with which the invention is concerned has a pump which simultaneously draws in the unwhipped liquid product and air, and forces the liquid and air mixture through a static homogenizer in which the product is whipped.

Because of the high rate of nefarious bacterial incidence in the particular liquids for which this kind of machine is designed, and in order to clean the machine adequately, it must be able to be stripped down satisfactorily and the components through which the product is pumped must be removable from one another. Although screw threads may be used for the various couplings, these are not entirely suitable because in each case there will be a female coupling and it is difficult to clean the internal screw threads.

It is also important to be able to control the viscosity of the aerated product and to prevent oozing of the product when the machine is stopped.

In accordance with the present invention such a machine comprises a pump which is driven by a motor and which has an inlet connected both to an air intake and through a suction tube to an unpressurized liquid product container whereby in use liquid product and air are simultaneously drawn into the pump, the pump having an outlet connected to a product discharge outlet through a flow path along which the pump can force the mixture of liquid product and air under a pressure of at least 75 p.s.i., the flow path incorporating both a static homogenizer which causes emulsification of the mixture and a solenoid-operated valve which is capable of interrupting the flow of product; readily releasable couplings between at least some of the components incorporated in the flow path whereby the components can be readily dismantled for cleaning; a member which is accessible externally of the machine and manipulation of which adjusts the proportion of air induced through the air intake; and a control system which, upon operation of the machine to discharge a portion of product, causes the valve to be opened and the pump motor to be started simultaneously and, subsequently, vice versa simultaneously.

The provision of the solenoid-operated valve adjacent to the product outlet and the inter-relationship between the pump motor and the solenoid-operated valve ensures substantially instantaneous starting and stopping of the product flow and no oozing when the machine is stopped in spite of the use of such high pressures in the machine. The manual, external adjustment to the air induction enables a rapid and sensitive variation in the viscosity of the outflowing product.

The control system may incorporate an actuating member actuation of which causes the solenoid-operated valve to be opened and the pump motor to operate for a predetermined time so that a predetermined portion of product is dispensed. This automatic control may be associated with a meter which gives a digital indication of the number of portions which have been dispensed. Preferably means are provided for enabling the predetermined time, and hence portion weight, to be changed.

It is convenient for the pump motor to be started and subsequently manually stopped, or started and subsequently automatically stopped when a measured portion of the product has been dispensed, by pushing a control button in the front casing panel of the machine. If this button is let into an aperture in the panel and is flush with or only slightly outwardly of the panel, sugar or other confectionary crumbs can get carried by the operator's fingers onto the button and become lodged or even carried through the aperture of the casing. This is extremely unhygienic since such crumbs are difficult to remove without dismantling the machine. Preferably therefore the actuating member consists of a push button having a stalk which extends forward from a front panel of a casing of the machine and terminates in an enlarged head. The machine is then operated by pressing the head of the knob with the back of the hand. This can be done quickly and gently by unskilled labor with fear of contamination only of the head of the knob which can readily be cleaned. The whole operation of the machine is therefore cheaper and more hygienic.

The head of the knob, which may be attached to a spindle which screws into a convention type of button, may be generally mushroom shaped, the flange of the mushroom concealing the aperture in the casing.

Alternatively, the actuating member which controls the dispensing of product may be a remote actuator, such as a switch member which is operated by pressure from the operator's trunk, knee or foot.

Preferably the solenoid-operated valve is positioned down stream from the homogenizer and quick release couplings are provided between the pump and the homogenizer, and between the homogenizer and the solenoid-operated valve whereby these components in the flow path can be readily dismantled for cleaning.

Each quick release coupling preferably involves a surrounding clamp and may comprise a gasket disposed between the adjacent ends of the adjacent components to be connected together, and a clamp which embraces annular flanges at the ends of the components whereby tightening of the clamp draws the two flanges together to compress the gasket.

It is believed that the efficiency of the machine derives from the use of a pump which provides a high output pressure sufficient to force the mixture of air and liquid product through the very narrow interstices in the static homogenizer. Accordingly the pump is capable of providing an output pressure of at least 75 p.s.i., preferably over 100 p.s.i. and in some circumstances up to 200 p.s.i. In view of the high pressures involved, a non-return valve is preferably provided at the pump outlet to prevent backflow of the product from the homogenizer into the pump when the pump motor stops.

In order to ensure the desired quality of the aerated creams and/or toppings, the amount of air which is induced with the liquid into the pump is critical and must be able to be adjusted extremely sensitively and there must be a proper relationship between the air ratio and the static whipping media.

In accordance therefore with an important feature of the invention the machine has a valve block mounted adjacent to the pump inlet, the block containing a valve chamber having a liquid inlet connected to the suction pipe, an outlet leading to the pump inlet, and a plug which screws into the chamber and forms the member accessible for manipulation externally of the machine, the plug having a bore through it from the atmosphere to a seating at its inner end which co-operates with a spring loaded needed in the chamber, the arrangement being such that when the pump operates and draws liquid in through the chamber the needle is moved by the pressure of the flow of liquid against its spring loading away from the seating to increase the air inflow which is induced, and the plug has a range of adjustment by screwing it into or out of the chamber to adjust the position of the seating to provide a fine adjustment of the induced air.

With this arrangement when there is no liquid intake the air is instantaneously and simultaneously cut off too, and on start-up there is absolutely no bypass liquid drawn off. The sensitive air inlet control enables variable flow rates, rapid speed of change over from one product to another, and maximum unit output per minute commensurate with the small dimensions of the machine. It also enables the production of extremely homogeneous aerated creams and/or toppings without appreciable air voids which would produce spitting and spattering and cause cripples, and with substantially any desired stiffness from liquid product having different viscosities, different fat contents, and different solids contents.

It is important that the air is only induced through the bore in the plug and not through any inevitable gap between the mating screw threads of he plug and valve block and in one construction the screw threads are sealed by a resilient sealing ring under an externally projecting head of the plug. The effective range of rotation of adjustment of the plug is then determined by the resilience of the sealing ring. In order to ensure a predetermined setting, the easily washable, sturdy, practically non-damageable plug preferably carries indicia on its top or side edge co-operating with fixed indicia on the outside of the block.

In order to be able to whip a wide range of different liquid creams and/or toppings, it is virtually impossible to provide the necessary fine adjustment with either a normally conceived needle valve or even a single new type variable plug. Thus the machine may be provided with a range of, for example, at least five, plugs having different diameter so that a selected one can be screwed into the chamber for co-operation with a needle. These plugs should have sub-divided indicia to the different values of the bore sizes. A suitable range of plugs are 0.3 mm. diameter; 0.5 mm. diameter; and 0.7 mm. diameter; 1.0 mm. diameter; and 1.5 mm. diameter. In each case the bores are between 0.5 mm. and 1.0 mm. long.

Unlike the manifold problems which would occur when non-skilled personnel would use a finely machined precision needle valve of such diverse adjustable features to cover the extensive range of requirements, this new arrangement and new type system is extremely simple and effective and is not easily subject to damage during cleaning or washing i.e. in the sink by unskilled labor. Also in the event of the very small air bore being partially blocked, for example by a slight splutter of a soft pellet from the liquid cream or topping into the valve chamber, the plug can simply and almost instantly be unscrewed from the block, be cleaned, and be refitted without any total disturbance of the sensitive needle and spring which still remain in place on the machine, and which are removed only periodically for inspection purposes.

The entrance to the plug from the atmosphere may be shielded by a porous shroud which filters the induced air.

The shroud preferably consists of gauze, for example made of a plastic material. It may be necessary to support the gauze shroud to prevent it from being sucked into the air passageway through the plug and for this purpose an open supporting cage may be provided inside the shroud for holding it away from the air plug. The shroud will also serve an additional purpose of catching any liquid product which splutters through the plug bore.

The plug may open externally into a hollow body portion which is shaped to prevent any product spitting through the bore into the hollow body portion from running back into the bore again and so blocking the bore. The shaping may consist for example of a dome-shaped base to the body which drains into a gutter.

The improved homogenizer is preferably a cylindrical barrel through which the mixture of liquid cream or topping and air is pumped, the barrel containing an alternating series of discs arranged coaxially face to face abutting one another within the barrel with one alternate set of discs having a central aperture but fitting tightly at their periphery against the barrel with the intervening discs being imperforate but having a clearance between their peripheries and the barrel with at least one face of the adjacent faces of adjacent discs being formed with a labyrinth of intersecting narrow channels. The mixture of liquid cream or topping and air is thus forced through the central aperture in one disc, radially but indirectly outwards through the channels, around the periphery of the next disc, radially inwardly but indirectly through the channels, through the aperture in the next disc and so on. This produces a most effective whipping action.

In one example, the one alternate set of discs are made of plastic material with concentric discontinuous annular walls on both faces defining a labyrinth of channels, preferably at least 2 mm. deep, and the intervening discs are substantially smooth faced metal discs.

The depth of the channels is important in preventing clogging by the product being whipped and, in conjunction with the variable air intake plugs enables the machine to be used for whipping creams having a butterfat content of between 25% and 48%, a result which has not previously been achieved.

However, as with the respective quantities of air induction, the number of discs through which the mixture passes is also critical and in the past has caused serious stoppages and thereby costly production problems and it has been desirable to redesign the machine so as to be able to make adjustments so that now the machine can whip liquid cream and/or toppings having appreciable different characteristics and yet the commercial requirements of unit speed, increased flow rates, and accuracy of unit weight deposits, have all been accomplished. One solution was to provide a simple coupling between one end of the barrel and the pump and between the other end of the barrel and the outlet, so that the barrel with its discs could be changed simply for one having a different length and a different number of discs. However this last mentioned method involved the provision of a number of barrels and adds to the expense and anyway this approach by itself does not provide the solution of the stoppage problem, commensurate with the necessary whipped stability requirements.

Preferably therefore the machine has a common barrel, but in addition to a complete set of discs for the barrel, a number of spacers which may be fitted in the barrel in place of an integral number of discs, the spacers when fitted in the barrel producing substantially no whipping action as a result of providing apertures through which the liquid and air can pass, the apertures having a size such that the volume of the product accommodated within the axial length of the spacer is substantially the same as that accommodated within the corresponding axial length of discs which the spacer replaces. With this spacer arrangement there is no further compression or expansion of the product as it passes the spacer to interrupt the steady flow of topping from the pump to the homogenizer to the outlet.

A suitable shape of spacer is a solid circular disc having four equiangularly spaced flats at its periphery so that the apertures are formed between the flats and the barrel wall.

In the preferred construction the machine consists of a refrigerated compartment, such as an open topped compartment which has a removable lid and the wall of which incorporates refrigerating elements. A short, usually rigid, liquid suction tube, which is coupled to the liquid inlet in the valve block, extends downward in the compartment, in use into a pan or disposable container of liquid in the compartment. In many cases this is acceptable. However, the period for which the machine can be run, before stopping to change or refill the container, then depends on the capacity of the container.

For larger production needs, this drawback is avoided if the machine is provided with a long flexible suction tube for use with a bulk container of liquid product, the free end of the tube which is arranged to be inserted into the bulk container incorporating a non-return valve through which the pump can draw liquid product but which closes when the pump stops. The action of a non-return valve maintains the flexible tube ready primed full of liquid product.

With this new arrangement the free end of the flexible tube can be inserted into either a disposable or returnable bulk liquid holder for substantially continuous operation of the machine, thus practically all extra handling costs are reduced to a minimum and maximum cleanliness is attainable. The non-return valve at the free end of the flexible tube may be a spring loaded valve, such as a ball valve, and is preferably mounted in a specially designed foot which will rest against the bottom of the bulk container. The foot may have a weight and/or extended spider to prevent tipping so as to ensure proper action of the non-return valve, and means, such as lateral openings at its perimeter and intermittent means between its central point and its perimeter, so that the foot cannot form a suction seal against the bottom and/or wall of the bulk container and prevent the entry of liquid into the flexible suction tube. This foot designed as indicated is particularly useful if the liquid container has thin flexible walls such as is the case with plastic bags or insert liners, commonly used with cardboard containers for carrying liquid creams or their equivalent.

Preferably, the machine has both a short suction tube for use with a container in the refrigerated compartment and a long flexible suction tube for use with a bulk container outside the compartment, there being a readily releasable coupling whereby either one of the tubes can be fitted into its operative position.

The bulk container, being too large to sit in the refrigerated compartment, rests alonside the machine and difficulties may arise in maintaining the bulk liquid container sufficiently cool so that the resulting emulsion product has the desired temperature.

This problem is overcome if means are provided in the refrigerated compartment for coiling the longer flexible tube inside the compartment between its foot, which will be inserted into the bulk liquid container, and its connection to the pump inlet. In this way the product sucked from the bulk liquid container will pass through the coiled tube a number of times around inside the refrigerated compartment before being sucked into the pump. This provides adequate cooling for the liquid product.

The means for coiling the tube inside the refrigerated compartment may consist of hooks around the inner wall of the refrigerated compartment in vertically spaced rows. The hose can then very quickly be coiled around the compartment by laying it in a helical configuration on the rows of hooks.

For large production operation, the use of the flexible pipe with a bulk liquid container for continuous operation of the machine is particularly useful if the machine is used with an open piping bag coupled to the machine outlet by a flexible hose, as described for example in my U.S. Pat. No. 3,285,202.

The output of the machine is such that a number of hoses with piping bags may be coupled to the machine outlet for simultaneous manipulation by a number of operators. The outflowing product must be divided before flowing into the hoses. For this purpose we use an adaptor having a cylindrical hollow body one end of which is arranged to be coupled to the machine outlet and which contains one or more axial webs dividing the cylinder into a number of parallel passageways of equal cross-section, each leading to an outlet with means for coupling to a hose. Preferably the upstream edges of the webs lie in an axial plane perpendicular to the axis of the cylinder. In this way the product is evenly divided into a number of separate flows without any expansion or contraction of the product following its passage through the homogenizer. In order that the machine may be used with any one of a different number of hoses and forcing bags, the machine pump speed is preferably adjustable so that the total product flow rate can be adjusted.

The pump is preferably, but not necessarily, a rotary vane pump of the kind having a pumping chamber containing an eccentric rotor which has a number of radial slots from which corresponding vanes are urged into engagement with the chamber wall.

For pumping efficiency it is important for the vanes to be a close fit within the slots and even if they are made or coated with a plastic material having a low coefficient of friction with the rotor, which is usually metal, they still tend not to slide quickly enough in the rotor if the machine is used with liquid product having a high solids content or a high viscosity, or both.

In order to mitigate this problem, without affecting the seal which the vanes must make with the walls of the slot, the faces of the vanes which slide against the walls of the slots are, in accordance with another feature of the invention, provided with shallow recesses. These recesses, which give the vanes and slot walls some of the characteristics of a fluid bearing may consist of one substantially rectangular recess in each vane face extending over at least a quarter and preferably a third, of the total surface area of the vane. They should however each be offset toward the edge of the vane nearer the center of the rotor so that the recess does not project outside the periphery of the rotor when the vane projects from the rotor to the maximum extent.

The solenoid operated valve may comprise a block having an inlet duct which is coupled to the downstream end of the homogenizer and leads into a valve chamber and an outlet duct which is coupled to the machine outlet and which leads from a seating in the valve chamber, the valve chamber being partly defined by a tubular housing one end of which is coupled to the block concentrically with the seating and which contains an axially sliding armature which is urged by a spring towards the seating to a position in which a resilient seal carried by the armature seals over the seating, and the housing being surrounded by a solenoid which, when energized, draws the armature away from the seating against the spring loading to open the valve.

It is of the utmost importance that the machine can be stripped down for cleaning quickly and simply. Now the end of the tubular housing remote from the seating must be sealed to prevent escape of whipped product entering the electromagnetic valve chamber and if the seal is permanent it is difficult to clean the inside of the chamber properly even though the housing is removable from the electromagnetic valve block. Preferably therefore, to eliminate the bacterial growth hazard, the end of the tubular housing remote from the seating is open and is sealed in use by means of a piston carrying a sealing ring which is inserted through the other end of the housing. The piston can then be removed from the housing for cleaning by inserting a tool to push the piston along the housing. Indeed this may be facilitated if the piston is provided with a projecting stub which projects through the opening in the end of the housing when the piston is seated at the end of the housing, the stud being screw threaded and being arranged to receive a nut which secures the solenoid casing around the housing.

One example of a machine constructed in accordance with the present invention is illustrated in the accompanying drawings in which:

FIG. 1 is a side elevation of the machine with parts broken away;

Figure 2:
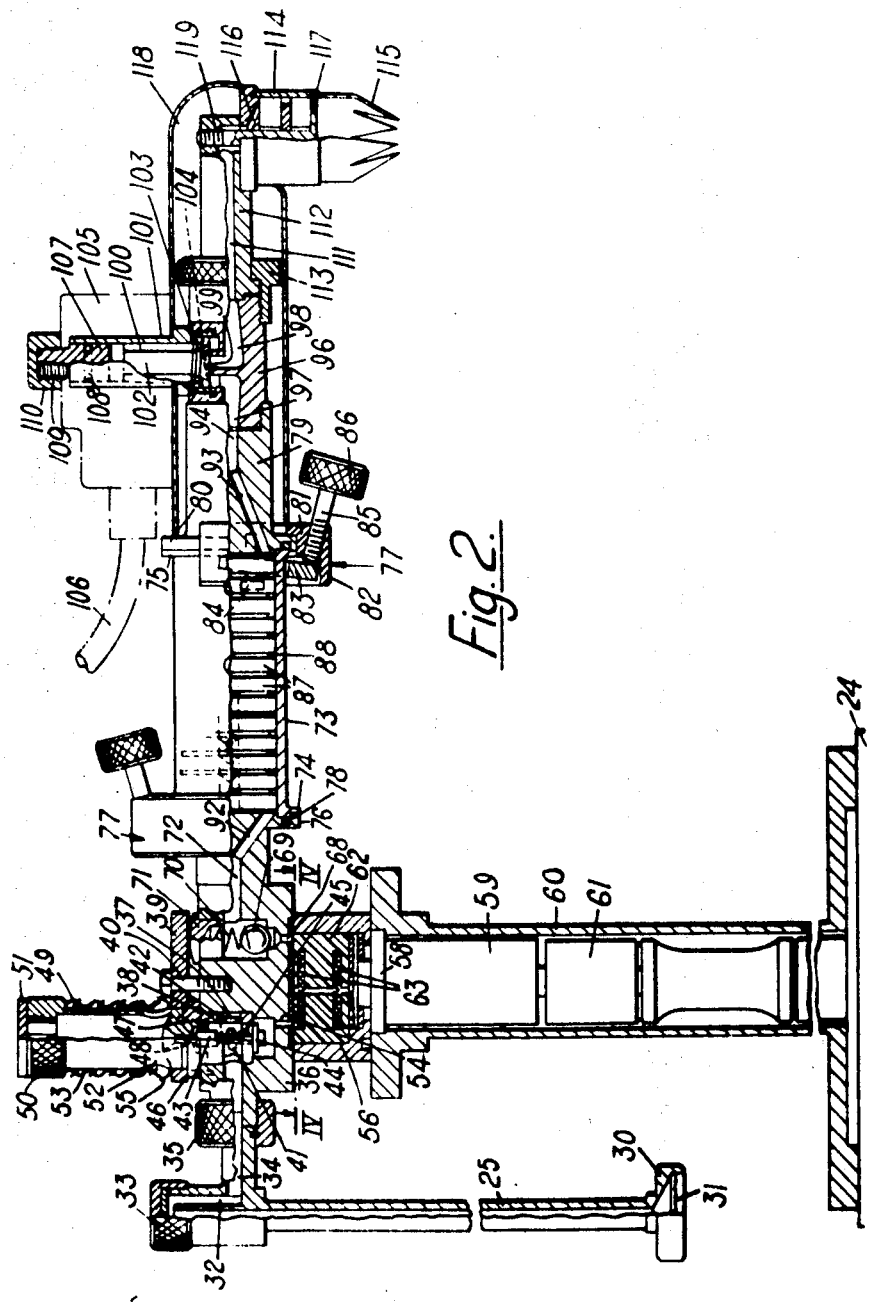
FIG. 2 is a side elevation partly in central section of the liquid aerating mechanism of the machine.

The machine has an outer cabinet 13 with legs 14 which are intended to stand on a counter or table. The cabinet 13 contains an internal partition 15 above which is an insulated compartment 16 covered by a removable lid 17 which has an opening closed by a smaller lid 18. The compartment 16 is insulated and refrigerated by means of refrigeration elements 19 which are mounted behind a wall 20 of the compartment and which are cooled by a refrigeration unit 21 below the partition 15. In use a preferably disposable container 22 is placed in the compartment 16 and is filled or refilled with cream or other liquid product after removal of the lid 18. A pump 23, driven from an electric motor 24 draws in the liquid product through a suction pipe 25 from the unpressurized container 22, and also draws in air through an air inlet valve 26, the mixture of liquid product and air being forced through a static homogenizer 27 where it is whipped before being discharged through an outlet 28 when a solenoid-operated check valve 29 is opened.

As shown in FIG. 2, the suction tube 25 is a rigid metal pipe having a foot 30 fitted with a sieve 31 through which the liquid product is drawn. The pipe 25 extends up into and, importantly, above the base of a priming chamber 32 which is sealed by a screw cap 33 so that when the pump stops it remains primed since some liquid product always remains in the chamber 32. From the chamber 32 the liquid product is drawn along a duct 34 through a releasable screw coupling 35 into a valve block 36 where it communicates with an annular chamber 37 formed between the block and a lining sleeve 38. This sleeve or insert 38 is sealed to the block and held in position by means of an overlying bridge plate 39 and stud 40. The sleeve 38 is formed with a ring of ports 41, forming liquid inlets and leading from the annular chamber 37 into an inner valve chamber 42 containing a needle 43. The needle has a stem which extends up through a hole in the bottom of the sleeve 38 and is urged upward to a position, in which a disc 44 on the bottom of the stem engages the bottom of the sleeve and closes the hole, by means of a helically coiled compression spring 45 acting between the base of the sleeve and the shoulder on the needle stem.

A moulded plastic plug 46 screws into the top of the sleeve 38 and is sealed to it by means of a resilient sealing ring 47. The plug 46 has a narrow air inlet bore 48 which terminates in a seating co-operating with the tip of the needle 43. The plug 46 has an upward extension in the form of a hollow body 49 terminating in a knurled ring 50 closed by a stopper 51. Two diametrically opposed ports 52 are formed at the bottom of the body 49 so that the bore 48 is open to the atmosphere. The body 49 is shown surrounded by a disposable filter 53 which may for example be a fine gauze made of a plastic material and which acts to filter air entering the body 49. The filter may be wrapped around the body or may be a split cylinder which is opened and allowed to close when it has been fitted around the body.

The liquid product is drawn from the chamber 37 through the ports 41 into the chamber 42 and thence through an outlet hole in the bottom of the sleeve 38 and through a duct 54 which leads into the pump inlet. As the liquid passes through the hole in the bottom of the sleeve 38 it draws the disc 44, and with it the needle 43, downward against the action of the spring 45 so that the needle 43 is withdrawn from the seating. As a result air in a proportion corresponding to the flow of liquid is drawn through the small bore 48 and induced with the liquid into the pump. The amount of induced air can be controlled very sensitively by screwing the plug 46 in or out within the range limited by the resilience of the sealing ring 47 and its need to provide a seal so that air is not drawn in through the screw threaded coupling between the plug 46 and the sleeve 38. The body 49 extends upward through a small hole in the cover 17 so that the knurled ring 50 is externally accessible for ready manipulation by the thumb and fore-finger. A presetting for the plug is provided by aligning numbered marks on the periphery of the part of the body which projects above the cover 17, with a mark on the top of the cover. Screwing of the plug 46 within the allowable range effectively adjusts the position of the seating at the lower end of the bore 48 and hence the air gap between the seating and needle 43 upon movement of the needle by the flow of liquid.

When a different range of air induction is required the plug 46 is simply unscrewed from the sleeve 38 and replaced by a plug having a bore 48 with a different diameter.

In the event of any product spurting into the bore 48 and impeding the air flow, the plug 46 is unscrewed from the sleeve 38 and in seconds it is quickly washed out. This cleaning action in no way affects the sensitive parts of the valve since the plug 46 is extremely robust and the sensitive needle and ancillary parts remain untouched on the machine. Any liquid product, or water during cleaning of the machine, tending to spurt through the bore 48 into the interior of the hollow body 49 drains down the inner wall of the body 49 and, owing to the domed shape of the base of the hollow body 49, out through the ports 52 into a gutter 55. The plug can then be removed and washed out.

Figure 3:
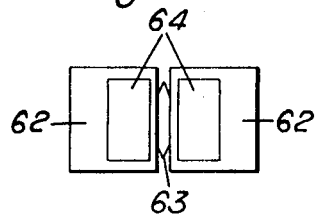
FIG. 3 is a scrap elevation of the vanes of a pump of the mechanism.

The pump 23 has a cylindrical chamber 56 containing an eccentric rotor 57 mounted on the upper end of a spindle 58 which is mounted in needle bearings 59 in a turret 60. The spindle 58 is releasably coupled to a driving shaft from the motor 24 by means of a keying coupling 61. The rotor 57 has a diametrical slot in which two synthetic plastic vanes 62 are radially slidable. The vanes 62 are urged radially outwardly into engagement with the wall of the chamber 56 by means of a pair of helically coiled compression springs 63 the ends of which are received in aligned blind bores in the two vanes 62. In order to ensure that the vanes 62 will slide freely within the rotor, even when the liquid product has a high solids ratio and/or viscosity, the vanes 62 are formed on each face with a shallow rectangular recess 64 as shown in FIG. 3.

When the valve block 36 is removed from the pump for cleaning purposes the vanes 62 can be withdrawn upwards out of the slot in the rotor 57. It is important that the vanes should always be returned in the same relative orientation since the sliding of the radially outer edges of the vanes over the chamber wall causes them to assume a complementary shape. For this purpose a mark is made in the top surface of the rotor 57 and the adjacent corners 65 of the two vanes 62 are cut or otherwise marked for recognition.

Figure 4:
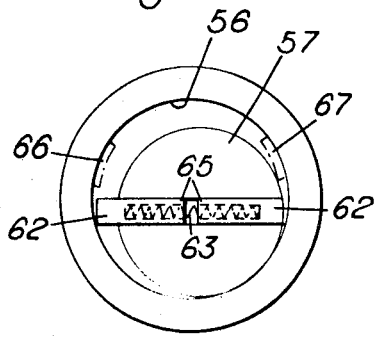
FIG. 4 is a section taken on the line IV—IV in FIG. 2.

As the rotor rotates, clockwise as seen in FIG. 4, the liquid product with the induced air is pumped from the pumped inlet 66 out through an outlet 67 into a duct 68 under a pressure of at least 100 p.s.i. The duct 68, is, in the absence of a differential pressure, closed by a valve consisting of a ball 69 which is urged downwards to close a seating at the upper end of the duct 68, by means of a helically coiled compression spring 70 which is located by a plug 71 sealed in position in the block 36 by means of the bridge plate 39.

When the pump is working the ball 69 is forced against the action of the spring 70 under the pressure differential and opens the duct so that the mixture of product and air can flow into a duct 72 and hence into the homogenizer 27.

The homogenizer consists of a cylindrical barrel 73 the ends of which are formed with annular flanges 74 and 75. The corresponding end of the valve block 36 is formed with an annular flange 76, complementary to the flange 74 and the barrel 73 is held in position by means of a quick release clamp 77 which clamps the flanges 74 and 76 together with an annular gasket 78 compressed between the flanges. Another similar clamp 77 couples the other end of the barrel 73 to a tubular connecting piece 79 formed with a flange 80 which complements the flange 75. Each clamp 77 consists of an outer C-shaped part 81 having a part annular flange 82 within which is located an inner C-shaped part 83. Two screws 84 extends loosely through the arms of the inner part 83 and are screwed into the arms of the outer part 81. As a result the inner part 83 is free to rock to and fro relatively to the outer part 81. A stud 85 screws through the base of the outer part 81 and is provided with a knurled knob 86. The inner end of the stud 85 engages the base of the inner part 83. When the stud 85 is screwed in by applying the fore-finger and thumb to the knob 86, the inner part 83 is caused to rock on the screws 84 so that the tips of the arms of the C of the inner part are forced toward those of the outer part, with the result that the flanges 74 and 76, or 75 and 80, respectively, are nipped together at substantially diametrically opposite positions. When the stud 85 is loosened, the clamp can simply be removed laterally from the flanges.

Figure 8:
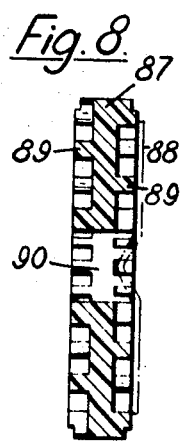
FIG. 8 is a section taken on the line VIII—VIII in FIG. 6.
Figure 9:
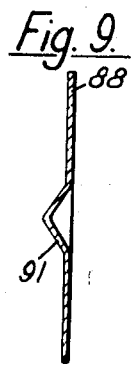
FIG. 9 is a section taken on the line IX—IX in FIG. 7.
Figure 10:
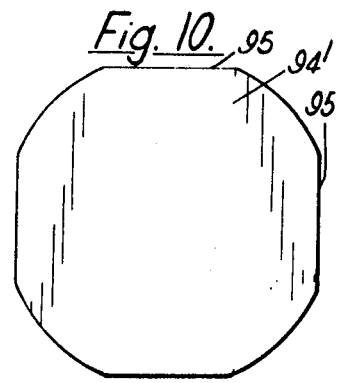
FIG. 10 is an elevation of an alternative form of disc for use in the homogenizer.

Within the barrel 73 is an alternating series of plastic discs 87 with intervening thinner metal discs 88. Each newly designed, improved plastic disc 87 is formed on each face with a number of discontinuous concentric integral rings 89, which project axially by 2 mm., the gaps between the segments of the rings being offset from ring to ring. This provides a labyrinth of intersecting channels between each plastic disc 87 and the adjacent metal disc 88. Each plastic disc 87 has a central aperture 90 but is a close fit within the barrel 73 and each metal disc 88 is imperforate but has an annular clearance between its periphery and the barrel 73. The metal discs 88 are located coaxially in the barrel by means of nipples 91 which are pressed out of the center of the metal disc and nest in the central aperture of the adjacent plastic disc 87 in the upstream direction, as suggested in the chain dotted lines in FIG. 8.

As the liquid product and air is forced through the duct 72 it is directed through a ring of diverging passageways 92 into the homogenizer and hence alternately around the edge of the disc 88, inwardly through the labyrinth of channels, through the central aperture 90 in a plastic disc 87, radially outwardly through the labyrinth of channels, around the edge of the next metal disc 88 and so on. In doing so the nipples 91 on the discs 88 also serve to divide the product so that it spreads radially outwardly in passing through the apertures 90 in the discs 87. Finally it passes through passageways 93 in the connecting piece 79 and thence into a duct 94.

This action thoroughly whips the liquid and air and blends them with a thorough mixing action into a homogenous viscous aerated product of pre-designed over-run value in a range from 60% to 400%.

One or more of the plastic discs 87 with the corresponding number of adjacent metal discs 88, may be replaced in the barrel 73 by spaced discs 94' of equal axial length which effectively provide no whipping action but which provide apertures between themselves and the barrel wall, owing to the provision of four equiangularly spaced flats at their periphery, through which the mixture of product and air can pass. The size of the apertures is such that no expansion or compression of the product occurs as it passes through the apertures.

The connecting piece 79 is sealed by a releasable screw coupling to a block 96 of the solenoid-operated valve 29. This block 96 has an inlet duct 97 forming an extension of the duct 94, and an outlet duct 98 leading from a seating 99 within a valve chamber 100. The valve chamber 100 is mainly defined by a tubular housing 101 which screws into the block 96 and contains an armature plunger 102 which is urged downwardly by a helically coiled compression spring 103 so that a block of resilient material 104 carried by the plunger 102 seals the seating 99 to close the valve. A solenoid 105 fits over the housing 101 and upon energization of the winding through a cable 106 the armature 102 is drawn upward in the housing 100 to open the valve.

For cleaning purposes the upper end of the housing 101 is closed by means of a piston 107 carrying a sealing ring 108 and formed integrally with a screw threaded stem 109. In use the stem receives a nut 110 to hold the solenoid 105 in position. However, when the valve is stripped down for cleaning the nut 109 is removed and the solenoid 105 is lifted off. The housing 101 is then unscrewed from the block 96 whereupon the plunger 102 can be drawn out of the bottom of the housing together with the piston 107 which can be pushed down from the upper end of the housing 101.

The duct 98 leads to another duct 111 formed in a connecting piece 112 which is sealed to the block 96 by means of a releasable screw coupling 113. The connecting piece 112 in turn carries a secondary homogenizer 114 similar in construction to the main homogenizer 17 and a star-shaped decorating nozzle 115 is carried by the secondary homozenizer 114. Thus the aerated product passes from the duct 111 through the number of diverging passageways 116 into the secondary homogenizer 114, around the discs as before and out through the passageways 117 to the nozzle 115. The primary purpose of the secondary homogenizer 114 is to ensure that the product is still properly whipped, mixed and spread laterally and then back to the center before it enters and leaves the nozzle 115 in case any separation has taken place in passing through the valve 29.

Since the valve 29 and the parts of the flowpath through which the product passes downstream of the valve are outside the refrigerated cabinet 13, an insulating tubular shroud 118 is provided. This is slid around the body of the valve 219 and the coupling pieces 79 and 112, from the right-hand end as see in FIG. 2, once the secondary homogenizer 114 has been removed by unscrewing a screw threaded spigot 119 by means of which it is connected to the connecting piece 112.

On occasions when it is unnecessary to strip down the whole machine for cleaning, or before stripping down, hot water is pumped through the machine. It is sometimes necessary to strip down the homogenizer 27 and for this purpose the clamps 77 are quickly undone and removed to free the barrel 73 and the discs are pushed axially out of the barrel and thoroughly washed.

The machine has a control system which ensures that that the pump motor 24 operates only when the magnetic valve 29 is open and vice versa. This is illustrated diagrammatically in FIGS. 1 and 5. A control panel 120 is mounted on the far side of the machine as seen in FIG. 1 and operates in association with the two control knobs 121 and 122 mounted in front of the front panel of the machine cabinet casing. The control panel 120 incorporates a main on/off switch 123 which energizes the refrigeration system and renders the controls live; a temperature gauge 124 indicating the temperature in the compartment 16 and a knob 125 which pre-sets the time for which the machine runs when operating automatically. The knobs 121 and 122 are each large mushroom shaped heads mounted on stalks which screw into conventional push button 126 accessible in apertuers in the cabinet front panel. The heads 121- and 122 can be readily operated by pressing them with the back of the hand without fear of contamination of the interior of the cabinet.

Figure 5:
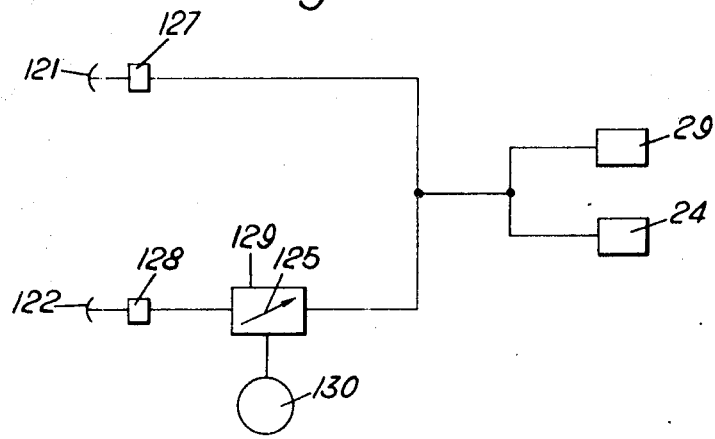
FIG. 5 is an electrical circuit diagram representing a control system of the machine.

As indicated in FIG. 5 pressing of the knob 121 operates a switch 127 which causes the solenoid 105 to be energized, so that the valve 29 is opened, and the motor 24 to be started, so that the pump 23 is operative, simultaneously. As a result, provided that the machine has been primed, product will immediately be discharged through the nozzle 115. This will continue until the knob 121 is repressed whereupon the switch 127 will reopen deenergizing the solenoid 105 and stopping the motor 24 so that the pump stops and the valve 29 recloses, simultaneously.

If the knob 122 is pressed, a switch 128 sends a signal to a timer 129, which has been preset by the knob 125, whereupon the valve 29 is opened and the motor 24 is started but after the preset time the valve is automatically reclosed with simultaneous stopping of the motor. During this time a preset portion of the product will be dispensed from the nozzle 115. Subsequent repressing of the knob 122 will cause a further portion to be dispensed and the aggregate number of portions dispensed will be recorded on a digital indicator 130.

The simultaneous operation of the valve 29 and pump motor is important because it ensures that the product flow path between the pump and the valve 29 remains under pressure when the machine is stopped intermittently. There is therefore no delay when the machine is restarted and no oozing occurs as a result of expansion of the product when the pump stops. The valve incorporating the ball 69 similarly prevents backflow of the product into the pump due to product expansion when the machine is stopped temporarily.

Figure 11:
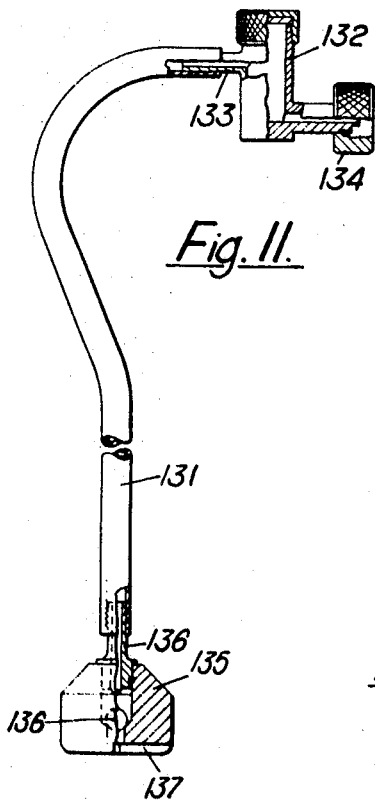
FIG. 11 is a partly sectional elevation of a flexible suction pipe for use with the bulk container; and, FIG. 12 is a partly sectional elevation of a pair of hoses and forcing bags which may be used with the machine.
Figure 6:
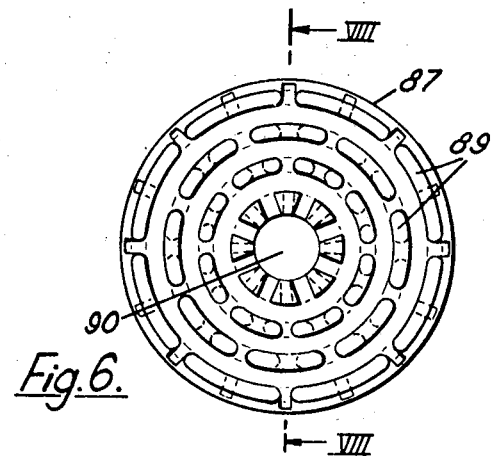
FIG. 6 is an axial elevation of one disc in a homogenizer of the mechanism.
Figure 7:
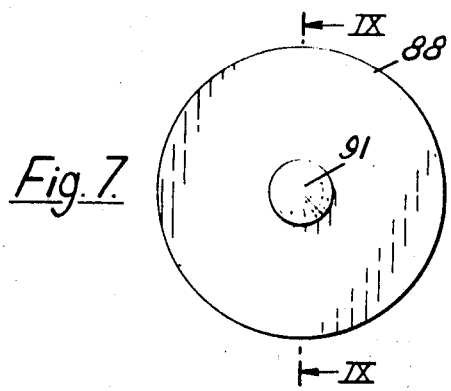
FIG. 7 is an elevation of a second disc for use in the homogenizer.

The suction pipe 25 may be replaced by a flexible hose 131 (FIG. 11) which may be long enough to extend into a bulk liquid product container for example resting on a table beside the cabinet 13. One end of the hose will be fitted to the valve block 36 by means of a coupling 132 having a spigot 133 over which the hose is pushed, and a screw coupling 134 directly equivalent to the screw coupling 35 shown in FIG. 2. To replace the pipe 25 by the hose 131 the knurled ring 35 is unscrewed and the ring 134 quickly screwed up in its place.

The other end of the hose 131 is provided with a comparatively heavy foot 135 having a spigot 136 over which the hose is pushed. The foot 135 incorporates a non-return ball valve 136 which closes automatically when the machine pump stops to retain the pipe 131 primed full of liquid product. Radial webs 137 on the underside of the foot 135 prevent a suction seal being formed with, for example, a flexible lining to a bulk container.

In order to ensure that liquid product drawn from the separate bulk container outside the refrigerated compartment 16 is cool when drawn into the pump, a central portion of the hose 131 may be coiled in the compartment 16, in the absence of the container 22, by laying it pseudo helically on rows of hooks 138 mounted on the wall 20 of the compartment.

Figure 12:
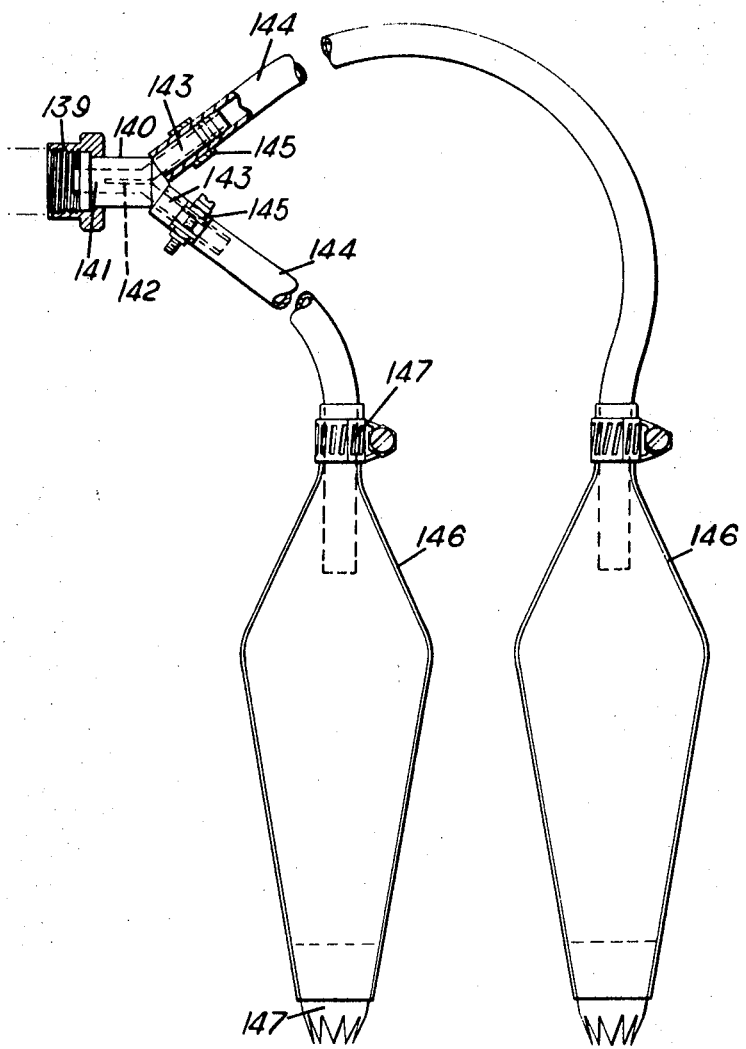

FIG. 12 illustrates the manner in which the machine can be used to supply continually one or more forcing bags for piping the product directly onto confectionery. A screw coupling 139, directly equivalent to the coupling 113 is fitted to the body of the electro-magnetic valve after removal of the shroud 118, the connecting piece, 112 and homogenizer 114. The coupling 139 supports an adaptor 14 having a cylindrical duct 141 containing a central axial web 142 which divides the flow of product evenly into two spigots 143. A flexible transparent plastic hose 144 is fitted over each spigot 143 and located in position by means of jubilee clips 145. The hoses 144 each have a wall thickness of $\frac{1}{16}$ of an inch providing sufficient rigidity for the neck of a thin flexible piping bag 146 to be clamped around the downstream end of the hose by means of another jubilee clip 147. A star decorating nozzle 147, which has been inserted into the bag 146 through its neck before clamping around the hose is located in the open tip of the bag by virtue of its frusto-conical shape being complementary to the end of the bag.

Each bag is manipulated by a different operator and the bag is alternatively compressed to reduce its capacity whereupon product pumped along the corresponding hose to the bag is extruded from the nozzle 147 onto the confectionery, and subsequently released so that the flow of product from the nozzle 147 is interrupted without interrupting the pumping of the product into the bag. In this way the bag can be moved from confection to confection without mess and without interrupting the operation of the machine.

The embodiments of the invention in which an exclusive property or privilege is claimed are defined as follows:

1. A machine for producing stiff, flowable, aerated, emulsion food products such as whipped cream and the like; and comprising: an unpressurized liquid product container; a pump having an inlet and an outlet; a motor for driving the pump; a suction tube leading from the container and operatively connected to the pump inlet; an air intake operatively connected to the pump inlet and having means accessible externally of the machine for manipulation to adjust the proportion of air induced through the air intake; the pump operable to draw in liquid product and air simultaneously and deliver the mixture to the pump outlet under a pressure of at least 75 p.s.i.; apparatus connected to the pump outlet and defining a flow path along which the mixture is pumped; the apparatus including a static homogenizer component for emulsifying the mixture, and a solenoid-operated valve component for interrupting the flow of the mixture; readily releasable couplings between at least some of the components of the flow path apparatus for quick disassembly thereof for cleaning purposes; and an electrical control system operable to open the solenoid-operated valve and start the motor simultaneously to discharge a portion of aerated food product, and to simultaneously close the solenoid-operated valve and stop the motor.

2. A machine according to claim 1, in which the electrical control system includes an interval timer which, when actuated, opens the solenoid-operated valve and operates the pump motor for a predetermined time so that a predetermined portion of aerated food product is dispensed.

3. A machine according to claim 2 including means for selectively adjusting the interval timer for enabling the predetermined time to be changed.

4. A machine according to claim 2 wherein the electrical control system includes a switch which may be closed to actuate the interval timer, and wherein the machine includes a casing; and including a push button for closing the switch and having a stem extending through the casing and an enlarged head outwardly of the casing.

5. A machine according to claim 1 wherein the components each have an annular flange at their adjacent ends; and each readily releasable coupling comprising a gasket disposed between the adjacent ends of the components, and a clamp for embracing the adjacent flanges so that tightening of the clamp draws the adjacent flanges together to compress the gasket.

6. A machine according to claim 1 in which the solenoid-operated valve is positioned downstream from the static homogenizer.

7. A machine according to claim 6 including a check valve at the pump outlet for preventing back flow of the mixture from the static homogenizer.

8. A machine according to claim 6 in which the solenoid-operated valve comprises a block having an inlet duct coupled to the downstream end of the homogenizer, a valve chamber communicating with the inlet duct, and an outlet duct coupled to the product discharge outlet and which leads from the valve chamber; a valve seat in the valve chamber; a tubular housing having one end coupled to the block concentrically with the valve seat and providing an extension for the valve chamber; an axially slideable armature in the tubular housing; a spring for urging the armature toward the valve seat; a resilient seal carried by the armature for sealing against the valve seat; a solenoid surrounding the housing; means for energizing the solenoid for drawing the armature away from the valve seat against the spring loading to open the valve; the end of the tubular housing remote from said one end being initially open; and a piston and a sealing ring on the piston insertable as a unit through said one end of the tubular housing for sealing the remote end thereof.

9. A machine according to claim 1 including a valve block mounted adjacent the pump inlet; the valve block having a valve chamber, a liquid inlet connected to the suction tube, and an outlet connected to the pump inlet; a plug adjustably mounted in the chamber and having a seat at its inner end and a bore leading from the seat to atmosphere to provide said air intake; and a needle in the chamber and resiliently urged toward the seat, but movable against the urging when the pump is operated to increase the air inflow which is induced, whereby the pump draws the liquid product and air simultaneously; and wherein the plug has an outer end which provides the means for manipulation to adjust the air induced by changing the position of the seat.

10. A machine according to claim 1 in which the static homogenizer comprises a cylindrical barrel, and an alternating series of discs arranged coaxially within the barrel in face-to-face abutting relationship, one alternate set of discs each having a central aperture but with its periphery fitting tightly against the barrel, the intervening discs each being imperforate but having a clearance between its periphery and the barrel with at least one face to the adjacent faces of adjacent discs being formed with a labyrinth of intersecting channels.

11. A machine according to claim 10 in which the one alternate set of discs are made synthetic resin with concentric but discontinuous annular walls on both faces defining a labyrinth of channels on each face, and the intervening discs are substantially smooth faced metal discs.

12. A machine according to claim 10 having discs of a number to fill the entire barrel, and including a number of spaces for fitting in the barrel in place of an integral number of discs, the spacers having apertures through which the mixture can pass with substantially no whipping action, and the apertures having a size such that the body of the mixture accommodated within the axial length of the spacer is substantially the same as that accommodated in the corresponding axial length of replaced discs.

13. A machine according to claim 1 including a refrigerated compartment for receiving the unpressurized container of liquid products, and a removable lid covering said compartment; and wherein the suction tube having a length such that it extends adjacent the bottom of the container in the compartment.

14. A machine according to claim 1 wherein the container is a bulk container of liquid product, and the suction tube is long and flexible and has a free end adapted to be inserted into the bulk container; and including a foot at the free end of the flexible suction tube and shaped so that it cannot form a suction seal against the bulk container, and a check valve at the foot which opens when the pump operates but closes when the pump stops.

15. A machine according to claim 14 including a refrigerated compartment in the machine; and means in the refrigerated compartment for coiling a portion of the long, flexible suction tube inside the compartment.

16. A machine according to claim 15 wherein the means for coiling the tube inside the refrigerated compartment comprises a plurality of hooks around the interior of the refrigerated compartment in vertically spaced rows.

17. A machine according to claim 1 wherein the apparatus defining the flow path includes a flexible hose downstream of the static homogenizer, and a collapsible piping bag at the downstream end of the flexible hose and the bag having an unobstructed discharge opening.

18. A machine according to claim 17 wherein the apparatus defining the flow path includes an adaptor between the static homogenizer and the flexible hose, the adaptor having a cylindrical hollow body one end of which receives the aerated product from the static homogenizer and at least one axial webs dividing the cylindrical body into parallel passageways of equal cross section, each passageway having an outlet, and means at each outlet for coupling the flexible hose thereto, whereby a plurality of flexible hoses with piping bags may be simultaneously utilized for dispensing the aerated product.

19. A machine according to claim 1 in which the pump is a rotary pump including a pumping chamber having a cylindrical inner wall, a rotor eccentrically mounted in the chamber and having a slot therein, a vane in the slot and having a recess in each face which slides against the side of the slot, and means for resiliently urging the vane into engagement with the chamber wall.

20. A machine for producing stiff, flowable, aerated, emulsion food products such as whipped cream and the like and including an unpressurized bulk container of liquid product, a pump operable to draw in liquid product and air simultaneously and having an inlet and an outlet, a suction tube operatively connected to the pump inlet, an air intake operatively connected to the pump inlet, and a static homogenizer operatively connected to the pump outlet for receiving a mixture of liquid product and air from the pump and for emulsifying the mixture; characterized in that the suction tube is a long flexible tube having a free end for insertion into the bulk container, and a check valve at the free end of the flexible tube through which the pump can draw the liquid product but which closes when the pump stops.

21. The combination of claim 20 including a foot at the free end of the flexible tube and shaped to prevent formation of a suction seal against the bulk container, the foot forming a housing for the check valve.

22. A machine for producing whipped cream and other stiff flowable aerated emulsion food products, the machine comprising a motor-driven pump having an inlet and an outlet, an air intake operatively connected to the pump inlet, an unpressurized liquid product container, a suction tube leading from the container and operatively connected to the pump inlet, whereby in use liquid product and air are simultaneously drawn into the pump, apparatus connected to the pump outlet and defining a flow path along which the mixture of liquid product and air is pumped to a product discharge outlet, and the flow path including a static homogenizer for emulsifying the mixture; characterized in that the flow path also includes a solenoid-operated valve for interrupting the flow of the product; the solenoid-operated valve comprising a block having an inlet duct coupled to the downstream end of the homogenizer, a valve chamber communicating with the inlet duct, and an outlet duct coupled to the product discharge outlet and which leads from the valve chamber; a valve seat in the valve chamber; a tubular housing having one end coupled to the block concentrically with the valve seat and providing an extension for the valve chamber; an axially slidable armature in the tubular housing; a spring for urging the armature toward the valve seat; a resilient seal carried by the armature for sealing against the valve seat; a solenoid surrounding the housing; means for energizing the solenoid for drawing the armature away from the valve seat against the spring loading to open the valve; the end of the tubular housing remote from said one end being initially open; and means inserted through said one end of the tubular housing for sealing the remote end thereof.

23. A machine according to claim 22 in which the last-mentioned means includes a piston and a sealing ring carried by the piston insertable as a unit through said one end of the tubular housing for sealing the remote end thereof, and the tubular housing being removably mounted on the block and said unit being removable from the tubular housing for cleaning purposes.

24. A machine for producing whipped cream and other stiff flowable aerated emulsion food products, the machine comprising a motor-driven pump having an inlet and an outlet, an air intake operatively connected to the pump inlet, an unpressurized liquid product container, a suction tube leading from the container and operatively connected to the pump inlet, whereby in use liquid product and air are simultaneously drawn into the pump, apparatus connected to the pump outlet and defining a flow path along which the mixture of liquid product and air is pumped to a product discharge outlet, and the flow path including a static homogenizer for emulsifying the mixture; the improvement comprising a valve block having a mixing chamber formed therein and operatively connected to the air intake and the suction tube; a needle valve assembly providing the air intake and including an externally accesible plug which is adjustable by screwing in and out of the valve block; the mixing chamber having an outlet connected directly with the pump inlet; and a resiliently urged check valve at the mixing chamber outlet and operable to open by the flow of mixed liquid and air when the pump is operated.

25. The combination of claim 24 whrein the plug and valve block have cooperating screw threads to provide the adjustable mounting of the plug; and including a resilient ring seal between the plug and valve block to seal the screw-threaded connnection throughout the practical range of adjustment of the plug.

26. The combination of claim 24 including indicia on the plug to enable predetermined setting of the plug.

27. The combination of claim 24 wherein said plug has a bore of a preselected diameter; and including a plurality of other plugs interchangeable with said plug and having bores of different diameters so that a selected one can be mounted in the valve block.

28. The combination of claim 24 wherein the plug has a bore communicating the chamber with atmosphere to provide the air intake, and including a porous shroud at the entrance to the bore from atmosphere to filter the induced air.

29. The combination of claim 24 wherein the plug has a bore communicating the chamber with atmosphere to porvide the air intake, and including means defining a hollow body portion communicating with the outer end of the bore and shaped to prevent any liquid product spitting through the bore from running back into the bore, thereby preventing blocking of the bore.

30. A machine as set forth in claim 24 wherein the air intake is at the top of the mixing chamber, the suction tube is connected to the side of the mixing chamber and the mixing chamber outlet is at the bottom thereof.

31. A machine as set forth in claim 30 including a priming chamber interposed in the suction tube.

32. A machine as set forth in claim 24 wherein the needle valve assembly includes a movable needle; and including a stem interconnecting the needle and the check valve, whereby the needle and check valve move in unison.

33. A machine as set forth in claim 32 including an insert in the mixing chamber and having an opening therein; and wherein the stem extends through the opening, and the check valve is in the form of a disc which closes against the insert; and including means above the insert for resiliently urging the disc to a closed position.

34. A machine as set forth in claim 33 wherein the last-mentioned means comprises a helically coiled compression spring surrounding the stem.

References Cited

UNITED STATES PATENTS

| | | | |
|---|---|---|---|
| 2,967,700 | 1/1961 | Lee | 261—140 |
| 3,089,683 | 5/1963 | Thomas | 259—4 |
| 3,203,371 | 8/1965 | Mosey | 107—31 |
| 3,266,780 | 8/1966 | Waters | 259—4 |
| 3,402,562 | 9/1968 | Menzel | 261—140 |

FOREIGN PATENTS

| | | | |
|---|---|---|---|
| 1,255,061 | 11/1967 | Germany | 259—4 |

ROBERT W. JENKINS, Primary Examiner

US. Cl. X.R.

107—31; 261—140